United States Patent [19]
Palm

[11] Patent Number: 5,079,844
[45] Date of Patent: Jan. 14, 1992

[54] COUNTERBALANCED RECIPROCATING MECHANISM

[75] Inventor: Bernhard Palm, Brookfield, Wis.

[73] Assignee: Milwaukee Electric Tool Corporation, Brookfield, Wis.

[21] Appl. No.: 612,525

[22] Filed: Nov. 13, 1990

[51] Int. Cl.⁵ .................. B23D 49/16; B23D 49/00; F16H 21/18
[52] U.S. Cl. ............................ 30/392; 30/393; 74/50
[58] Field of Search ............. 30/166, 392, 393, 394; 74/50

[56] References Cited

U.S. PATENT DOCUMENTS

| | | | |
|---|---|---|---|
| 3,170,496 | 2/1965 | Kohler et al. | 30/392 |
| 3,863,342 | 2/1975 | Griffies et al. | 30/393 |
| 3,971,132 | 7/1976 | Griffies et al. | 30/393 |
| 4,699,036 | 10/1987 | Henne | 30/392 |
| 4,976,164 | 12/1990 | Lentino | 30/393 |

Primary Examiner—Douglas D. Watts
Assistant Examiner—Paul M. Heyrana, Sr.
Attorney, Agent, or Firm—Bayard H. Michael

[57] ABSTRACT

The motor drives the crown gear which has an upwardly projecting eccentric drive pin which drivingly engages the channel fixed on the spindle which reciprocates in the fixed tube and supports a saw blade. The induced vibration is counterbalanced by the reciprocating counterbalance which slides on the outside of the tube. The crown gear has a cylindrical drive member which engages the cylindrical hole in the transfer block. The transfer block is moved in an orbital path and the opposed parallel sides engage and reciprocate the counterweight. The crown gear and cylindrical drive member have material removed to counterbalance the two drives.

16 Claims, 2 Drawing Sheets

5,079,844

COUNTERBALANCED RECIPROCATING MECHANISM

This invention relates to reciprocating saws of the type using an eccentric drive. Saws of this type develop considerable vibration. This invention is directed to reducing such vibration.

CROSS REFERENCE TO COPENDING APPLICATION

My application Ser. No. 541,093 filed June 20, 1990 as a continuation-in-part of Ser. No. 487,219 filed Mar. 1, 1990 shows an in-line saw using a counterbalanced wobble plate drive.

SUMMARY OF THE INVENTION

This invention provides a pinion gear driving a crown gear which has an eccentric drive to the shaft on which a saw blade is mounted. The crown gear also has an eccentric drive to a counterbalance, the saw blade and the counterbalance reciprocate 180 degrees out of phase, thus essentially eliminating all vibration.

More specifically, this invention provides an eccentric drive to a saw blade to reciprocate the saw blade while at the same time reciprocating a counterbalance. The eccentric drive of the saw blade is somewhat conventional. The spindle which supports the saw blade reciprocates inside a tube fixed in the housing. A counterbalance mass reciprocates on the tube and is prevented from rotating about the tube. The crown gear is provided with a cylindrical drive which is eccentric to the center of the crown gear. This cylindrical circular drive engages the counterbalance which, as noted, is constrained to reciprocating motion. The momentum of the counterbalance and the combined momentum of the spindle and a typical saw blade are essentially equal so the vibration is cancelled. Material is removed from the crown gear and cylindrical drive member to ensure that the crown gear, the eccentric drive and the cylindrical drive are balanced and do not set up lateral vibration.

DETAILED DESCRIPTION OF THE DRAWING

Figure 1:
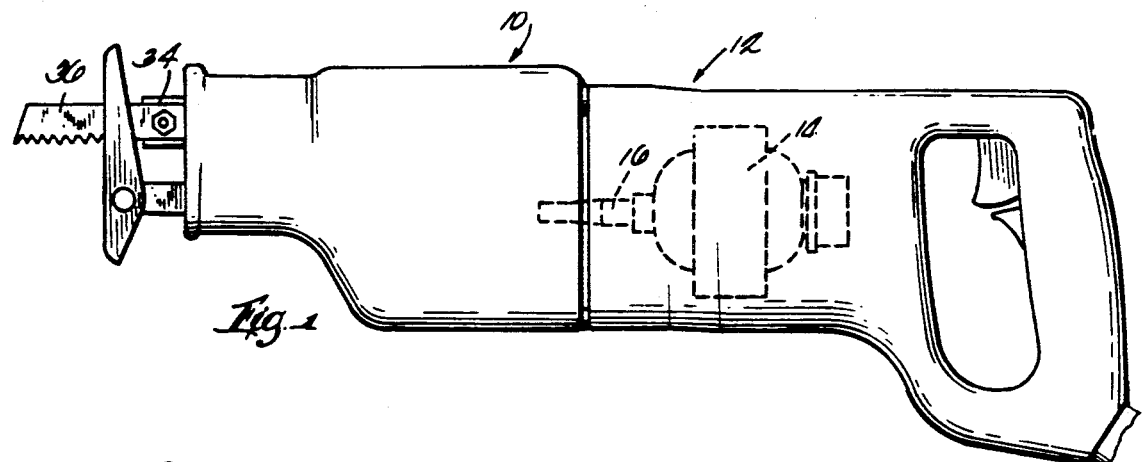
FIG. 1 is a side elevation view of a reciprocating saw provided with this invention.

The reciprocating saw shown in the drawings has a gear case 10 on the front of handle portion 12. Drive motor 14 has a drive shaft 16 with gear 18 driving crown gear 20 which is fixed on shaft 22 by key 24. Shaft 22 is rotatably mounted in bearings 26, 28 fixed in the gear case 10. Bearing 26 is retained in the case by annular plate 30 held in place by screws 32.

Figure 2:
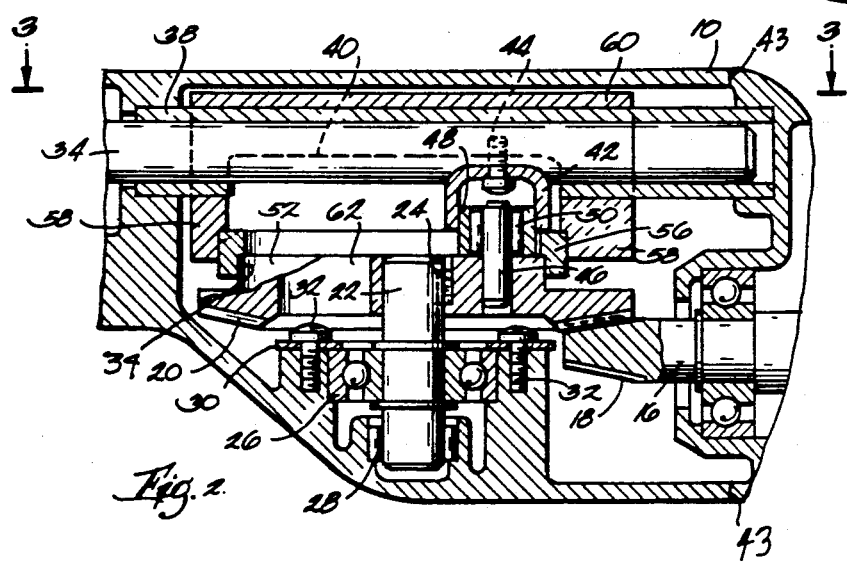
FIG. 2 is a vertical section through a portion of the saw shown in FIG. 1.
Figure 3:
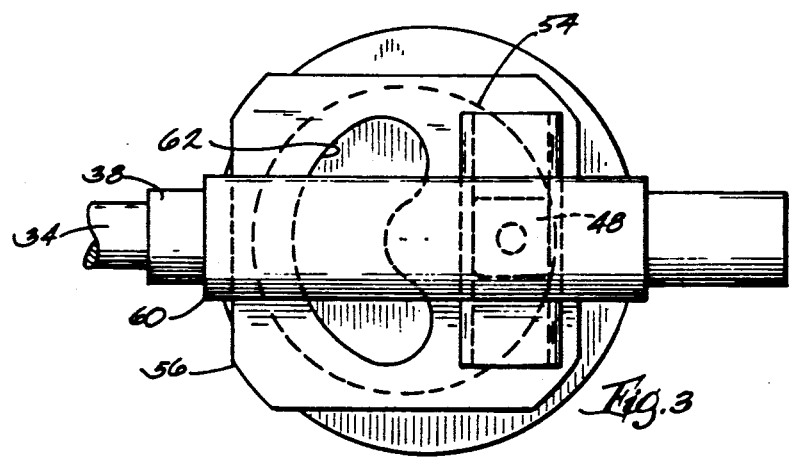
FIG. 3 is a horizontal view taken on line 3—3 in FIG. 2.
Figure 4:
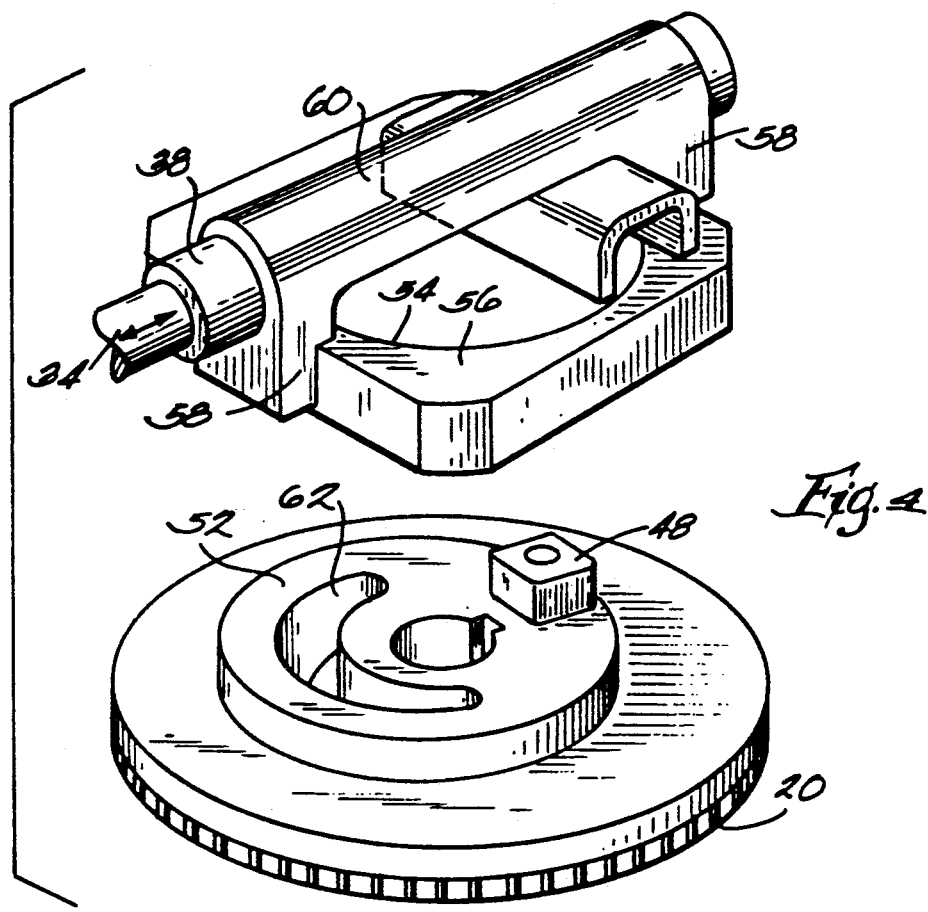
FIG. 4 is an exploded perspective view of the main parts of the drive for the spindle and the counterbalance.

Spindle 34 on which saw blade 36 is mounted in the usual manner reciprocates in tube 38 which has its ends fixed in the gear case. The bottom portion of the tube is cut away as indicated by the dashed line 40 in FIG. 2 to allow the inverted channel 42, which is connected to the spindle 34 by fastener 44, to move between the ends of the cutout. A first or primary eccentric drive means, reciprocates the spindle. This drive means includes eccentric drive pin 46 which projects upwardly from the top of the crown gear and has a square drive block 48 mounted thereon on roller bearings 50. The opposed sides of the block slideably fit inside the depending legs of the inverted channel. The flat sides of the block minimize the loading between the drive pin and the channel to thereby reduce wear. As the crown gear rotates, the eccentric drive pin and block force the channel and spindle to reciprocate in the tube 38.

A secondary or second drive means reciprocates the counterweight and includes a cylindrical drive member 52 which projects upwardly from the top of the crown gear and is eccentric to the center of the crown gear in the direction opposite the eccentricity of the pin. This cylindrical member engages cylindrical hole 54 in the generally square transfer block 56. Block 56 engages the depending legs 58, 58 of counterweight 60 which slides on the outside of tube 38. Since there is a substantial surface contact between the block and the legs of the counterweight wear is minimized. If desired, a ring bearing can be provided between the circular drive member and hole 54 in the block.

It will be noted that the crown gear and cylindrical drive member have a crescent shaped cutout 62 to reduce material and counterbalance both the block 56 and the cylindrical eccentric drive member/gear about the gear axis. It is well to keep in mind that the crown gear and the associated eccentric drives (pin 46 and cylindrical member 52) and the transfer block 48 are effectively a unitary rotating mass and the removal of the material in the cutout can balance the mass. Thus, the counterbalance 60 counterbalances the spindle and saw blade while the eccentric drives for both the spindle and the counterbalance are counterbalanced to avoid inducing vibration either parallel to or transverse to the spindle motion.

I claim:

1. A reciprocating drive mechanism comprising,
a housing,
a spindle mounted in said housing for reciprocating motion,
a counterweight mounted in said housing coaxial with said spindle and moveable relative to said spindle,
eccentric drive means for reciprocating said spindle,
eccentric drive means for reciprocating said counterweight in the direction opposite the direction of said spindle so the axial forces induced by reciprocation of the spindle are substantially cancelled, with by means counterbalancing said drive means.

2. A reciprocating drive mechanism according to claim 1 in which the spindle supports a tool and the axial forces induced by the stroke and mass of said counterweight approximate the axial forces induced by the stroke and combined mass of said spindle and said tool.

3. A reciprocating drive mechanism comprising,
a housing,
a spindle mounted in said housing for reciprocating motion,
a counterweight mounted in said housing for reciprocating motion relative to said spindle,
said spindle and said counterweight being concentric, and
first eccentric drive means for reciprocating said spindle and second eccentric drive means for reciprocating said counterweight in opposite directions so the axial forces induced by reciprocation are substantially cancelled.

4. A reciprocating drive mechanism comprising,
a housing,
a drive motor in said housing,
a spindle mounted in said housing for reciprocating motion,
a counterweight mounted in said housing for reciprocating motion parallel to and concentric with said spindle,
first and second eccentric drive means driven by said motor and connected to said spindle and said counterweight respectively,
said drive means being operative to reciprocate said spindle and said counterweight in opposite directions.

5. A drive mechanism in accordance with claim 4 in which the mass and stroke of said first drive means and said spindle are proportioned relative to the mass and stroke of said secondary drive means and said counterweight so the axial forces induced by reciprocation are substantially cancelled.

6. A drive mechanism in accordance with claim 5 in which said first and second eccentric drive means are counterbalanced.

7. A drive mechanism in accordance with claim 6 including a guide sleeve mounted in said housing,
an axial slot in said sleeve,
said spindle being slideably mounted in said sleeve,
said first drive means projecting through said slot in said sleeve to drivingly engage said spindle.

8. A drive mechanism in accordance with claim 7 in which said counterweight is mounted on said sleeve for reciprocating motion.

9. A drive mechanism in accordance with claim 8 in which said second drive means includes an eccentric cylindrical drive member, a transfer block having a hole engaged by said cylindrical drive member to be driven by said cylindrical drive member in an orbital path, said block having opposed parallel sides slideably engaging said counterweight to cause the counterweight to reciprocate on said sleeve.

10. A reciprocating saw in accordance with claim 9 in which the mass and stroke of said primary drive means and said spindle are proportioned relative to the mass and stroke of said secondary drive means and said counterweight so the axial forces induced by reciprocation are substantially cancelled.

11. A reciprocating saw in accordance with claim 10 including means for counterbalancing said primary and secondary eccentric drive means.

12. A reciprocating saw in accordance with claim 11 including a guide sleeve mounted in said housing,
an axial slot in said sleeve,
said spindle being slideably mounted in said sleeve,
said primary drive means projecting through said slot in said sleeve to drivingly engage said spindle.

13. A reciprocating saw in accordance with claim 12 in which said counterweight is mounted on said sleeve for reciprocating motion, said counterweight including a recess receiving said secondary drive means.

14. A reciprocating saw in accordance with claim 13 in which said second drive means engages said counterweight.

15. A reciprocating saw comprising,
a housing including a gear case,
a motor in said housing and having a motor shaft,
a pinion gear on said shaft,
a crown gear mounted in said housing and driven by said pinion gear,
a spindle mounted in said gear case for reciprocating motion,
a counterweight mounted in said case for reciprocating motion parallel to and concentric with said spindle,
primary and secondary eccentric drive means mounted on said crown gear and connected to said spindle and said counterweight respectively,
said primary and secondary drive means operating to reciprocate said spindle and said counterweight in opposite directions.

16. A reciprocating saw comprising,
a housing including a gear case,
a motor in said housing and having a motor shaft,
a crown gear rotatably mounted in said housing and driven by said motor shaft,
a spindle mounted in said gear case for reciprocating motion,
first eccentric drive means connecting said crown gear to said spindle to reciprocate said spindle as said crown gear is rotated,
a counterweight mounted in said gear case for reciprocating motion parallel to and concentric with said spindle axis,
a second eccentric drive means connecting said crown gear to said counterweight,
said first and second eccentric drive means being offset with respect to each other so the forces induced by reciprocation of the spindle is counterbalanced by the counterweight.

* * * * *